(12) United States Patent
Duetta et al.

(10) Patent No.: US 11,019,020 B2
(45) Date of Patent: *May 25, 2021

(54) SYSTEM AND METHOD FOR GENERATING A USER STATUS AND AUTHENTICATING SOCIAL INTERACTIONS IN A COMPUTER NETWORK

(71) Applicant: IOU CONCEPTS INC., Binbrook (CA)

(72) Inventors: Colin Duetta, Binbrook (CA); Felix Leung, Toronto (CA); Michael Salvatori, Burlington (CA); Ken Bentham, Burlington (CA)

(73) Assignee: IOU CONCEPTS INC., Binbrook (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/701,943

(22) Filed: Dec. 3, 2019

(65) Prior Publication Data

US 2020/0280532 A1 Sep. 3, 2020

Related U.S. Application Data

(63) Continuation of application No. 15/556,745, filed as application No. PCT/IB2016/051377 on Mar. 10, 2016, now Pat. No. 10,498,691.

(60) Provisional application No. 62/131,560, filed on Mar. 11, 2015.

(51) Int. Cl.
*H04L 12/58* (2006.01)
*G06F 21/62* (2013.01)
*G06Q 50/00* (2012.01)
*G06Q 10/10* (2012.01)
*H04L 29/06* (2006.01)

(52) U.S. Cl.
CPC .......... *H04L 51/32* (2013.01); *G06F 21/6245* (2013.01); *G06Q 10/10* (2013.01); *G06Q 50/01* (2013.01); *H04L 51/16* (2013.01); *H04L 63/126* (2013.01)

(58) Field of Classification Search
None
See application file for complete search history.

(56) References Cited

U.S. PATENT DOCUMENTS 8,214,238 B1 * 7/2012 Fairfield ............ G06Q 10/0639
705/7.11
2002/0116266 A1 * 8/2002 Marshall ................ G06Q 30/02
705/14.14

(Continued)

*Primary Examiner* — Davoud A Zand
(74) *Attorney, Agent, or Firm* — Perry + Currier Inc.

(57) ABSTRACT

Providing user status in a computer network includes storing associations of interaction indications to different interaction events, storing values for the interaction indications, and maintaining accounts for users performing the different interaction events. Interaction indications are received via the computer network from terminals associated with the accounts. Each interaction indication identifies a target account. Values of a set of interaction indications are combined using a limiting function that accumulates the values of the set into an accumulated value and progressively limits the accumulated value as the interaction indications in the set increase. An indication of the accumulated value is outputted as a status of the particular target account.

20 Claims, 11 Drawing Sheets

(56) References Cited

U.S. PATENT DOCUMENTS

2006/0089837 A1\* 4/2006 Adar .................... G06Q 50/182
 705/309
2014/0236953 A1\* 8/2014 Rapaport ............... G06Q 10/10
 707/740

\* cited by examiner

SYSTEM AND METHOD FOR GENERATING A USER STATUS AND AUTHENTICATING SOCIAL INTERACTIONS IN A COMPUTER NETWORK

CROSS-REFERENCE TO RELATED APPLICATION

This application is a continuation of U.S. application Ser. No. 15/556,745, filed Sep. 8, 2017 now U.S. patent Ser. No. 10/498,691, issued Dec. 3, 2019, which is a 371 of International Patent Application PCT/IB2016/051377, filed Mar. 10, 2016, which claims priority to U.S. patent application Ser. No. 62/131,560, filed Mar. 11, 2015, the entireties of all of these aforementioned applications are incorporated by reference herein.

FIELD

This disclosure relates to computers, computer networks, and communications.

BACKGROUND

Computer networks are known to be used to accumulate data about individuals, corporations, and other organizations. Such data can be in the form of user social connections, reviews and opinions about corporations and organizations, opinions about content, and similar. However, due to the nature of widely distributed computer networks, such as the Internet, the authenticity of such data is often suspect.

Data pertaining to social connections and interactions can lack authenticity for a wide variety of reasons. The technological workings of a computerized social network may allow users to express a quantitative opinion about information posted by other users (e.g., "like" such information). While a number of likes is ostensibly proportional to the social relevance of such information, other factors are frequently left unconsidered. For instance, programmatic scripts are known to be used to repeatedly and automatically assign likes to information, thereby falsely inflating its social relevance. Users may also simply "like" information posted by their close connections regardless of its actual content.

The technology behind computerized social networks often also fails when quantizing connections among users. Often a quantity of connections (friends, contacts, etc.) of a user is displayed, and frequently other users take this quantity to be measure of connectedness, influence, or social reach of the user. As users become more sophisticated, they often discount a user's number of connections by taking into account the failure of the computerized social network to compensate for its inherent weaknesses. The quantity of connections and other metrics become less meaningful. It becomes difficult for anyone to assess the social connectedness of a user with 500 connections versus a user with 50 connections, and the latter user in reality may be more connected.

Status of users is another metric that can assist other users in evaluating authenticity of data pertaining to social connections and interactions. Known types of status include physical status (e.g., online/offline), relational status (e.g., busy, available, etc.), and content-related status (e.g., "contributor", "new user", post count, number of friends, number of connections, number of followers, etc.). Many of these could assist in discerning the quality of data presented. However, "gaming" of such systems is common and often status is not indicative of quality. (In this context, gaming means the exploitation or manipulation of rules, systems, or infrastructure to achieve a benefit in a way not intended or condoned by the creator of such.)

The gaming of various computer systems for social connection and interaction can often have real world consequences. Users who have a high status can be afforded more credibility or opportunity inside and outside of the computerized social network. For example, a user who wishes to appear more charitable to obtain employment may need only request connections with charitable users or organizations and post content that has a high chance of being "liked" by such users and organizations. The user may, in reality, not have a charitable nature and may not be a good fit for the job. Further, communications resources may be wasted due to "gamed" status that inaccurately shows that a user is a suitable destination for such communications. Many existing techniques for determining user status are susceptible to gaming or have fundamental flaws that give rise to nonsensical statuses, particularly when comparing the statuses of various users.

The above problems are a result of the computerization of social networks. In physical social networks, people are often naturally skilled at discerning the nature of their cohorts. Often what fosters the lack of authenticity in computerized social networks are the same quantizing and semi-anonymous characteristics that enable their wide reach.

SUMMARY

According to one aspect of the present invention, a method of generating and outputting user status in a computer network includes storing associations of interaction indications to different interaction events, storing values for the interaction indications, maintaining a plurality of accounts for a plurality of users performing the different interaction events, and receiving a plurality of the interaction indications via the computer network from a plurality of terminals associated with the plurality of accounts, each interaction indication of the plurality of the interaction indications identifying a target account of the plurality of accounts. The method further includes, for a set of interaction indications identifying a particular target account, combining the values of the set of interaction indications using a limiting function that accumulates the values of the set of interaction indications into an accumulated value and progressively limits the accumulated value with increasing interaction indications in the set. The method further includes outputting an indication of the accumulated value as a status of the particular target account among the plurality of accounts.

The limiting function can include a logarithmic function.

The limiting function can include a plurality of subset limiting functions applied to subsets of the set of interaction indications, each subset related to a different interaction event.

At least one of the subset limiting functions can include a logarithmic function.

At least one of the subset limiting functions can include a plurality of type limiting functions applied to different types of interaction indications related to one of the interaction events.

At least one of the type limiting functions can include a logarithmic function.

The method can further include performing the combining and outputting for each account of the plurality of accounts.

The limiting function can exclude a number of interaction indications over a threshold received from another account over a set time period.

The different interaction events can include social media interactions.

The different interaction events can include private-network interactions.

The different interaction events can include real-world events.

According to another aspect of the present invention, a system for user status in a computer network includes stored associations of interaction indications to different interaction events, and stored values for the interaction indications. The system further includes a plurality of accounts maintained for a plurality of users performing the different interaction events. The system is configured to receive a plurality of the interaction indications via the computer network from a plurality of terminals associated with the plurality of accounts, each interaction indication of the plurality of the interaction indications identifying a target account of the plurality of accounts. The system further includes a status engine configured to, for a set of interaction indications identifying a particular target account, combine the values of the set of interaction indications using a limiting function that accumulates the values of the set of interaction indications into an accumulated value and progressively limits the accumulated value with increasing interaction indications in the set. The system is further configured to output an indication of the accumulated value as a status of the particular target account among the plurality of accounts.

The limiting function can include a logarithmic function.

The limiting function can include a plurality of subset limiting functions applied to subsets of the set of interaction indications, each subset related to a different interaction event.

At least one of the subset limiting functions can include a logarithmic function.

At least one of the subset limiting functions can include a plurality of type limiting functions applied to different types of interaction indications related to one of the interaction events.

At least one of the type limiting functions can include a logarithmic function.

The status engine can be further configured to perform the combining and outputting for each account of the plurality of accounts.

The limiting function can exclude a number of interaction indications over a threshold received from another account over a set time period.

The different interaction events can include social media interactions.

The different interaction events can include private-network interactions.

The different interaction events can include real-world events.

BRIEF DESCRIPTION OF THE DRAWINGS

The drawings illustrate, by way of example only, embodiments of the present disclosure.

DETAILED DESCRIPTION

According to the present invention, user status (or score) can be based on interaction indications (or points) assigned to the user by various sources. Points are a form of interaction indication that describes a type, level, depth, quality, effort, impact, intensity, time (e.g., hours taken to perform a service), money (e.g., dollars donated), and/or character of the interaction between two people, between a person and an organization, or between other entities (generally "user"). The points may be assigned from one user (e.g., person, company, institution, organization, device) to another, and a user may also assign points to himself/herself/itself. The points are accumulated by each user and presented as a status that can be used to assign a level of trust, authenticity, and/or other characteristic to each user with regards to the user's communications. In one example, the status is a score that is a measure of gratitude shown to the user for various positive actions that the user has performed. As such, the status can be referenced by systems and users to evaluate which kinds of communications can/should be sent to the user.

The present invention restricts or prevents gaming of one's status. Various methods are contemplated as will be discussed below in detail. Generally, values (or points) of interaction indications that affect the status (or score) are automatically modulated such that repetitive/redundant assignments of points are gradually given less effect on the status. The status thus becomes a way for systems and users to control their communications with others, restricting communications based on certain status and increasing communications based on other status, so as to improve computer network communications. This advantageously can solve or mitigate the technical problem of bandwidth consumption by overuse of communications resources, in that the status described herein can indicate to users which parties will accept or be receptive to communications. Senders can then self-regulate based on status of receiver, thereby reducing resource consumption. This is an Internet-specific problem, in that Internet communications by their very nature are trivial to undertake and often do not require consent of the receiver, and a large bulk of Internet communication is unsolicited or undesired. The present invention encompasses other techniques and solves other problems that will also be discussed below.

Figure 1:
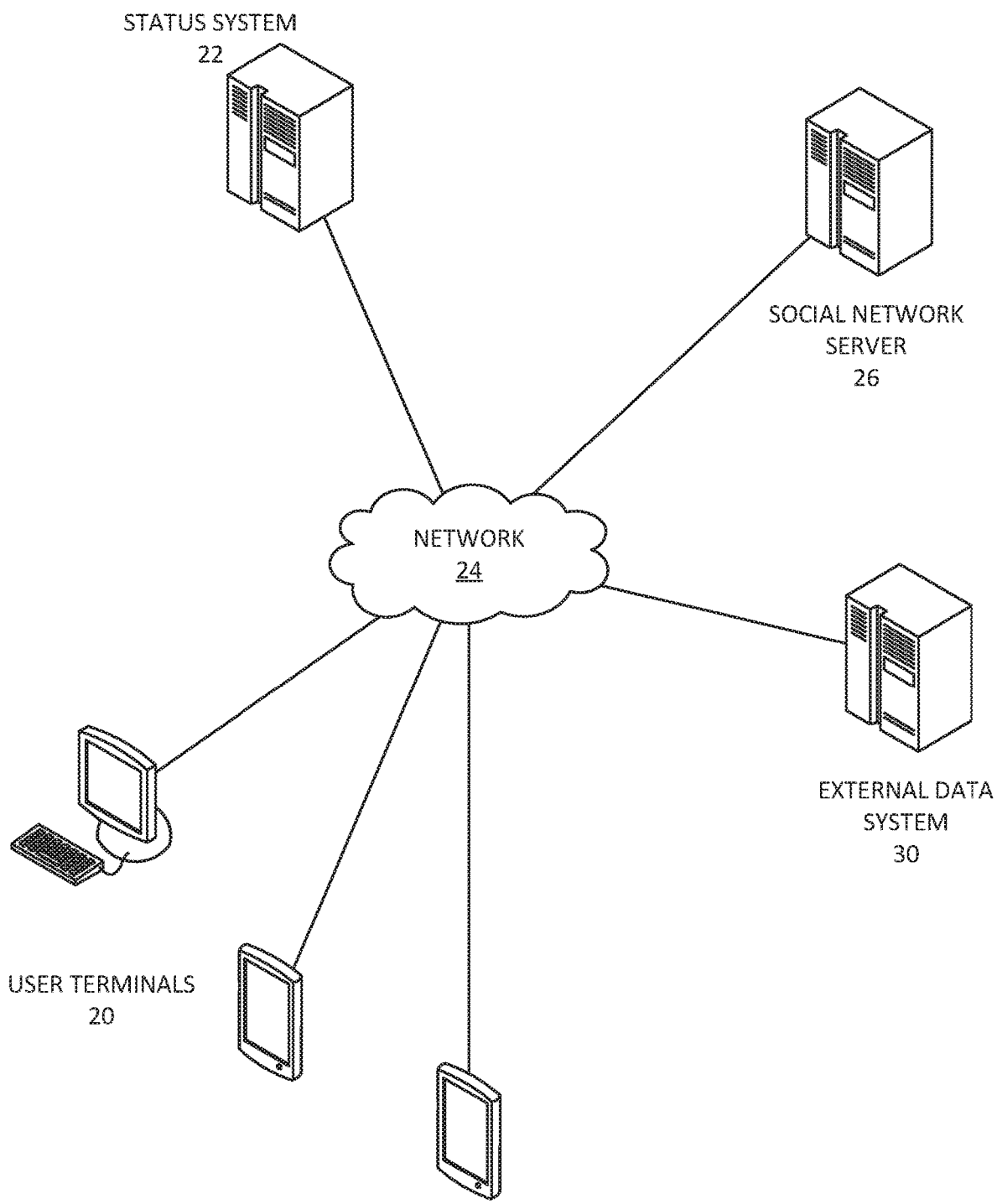
FIG. 1 is a diagram of a system according to the present invention.

FIG. 1 shows a networked computer system that includes a plurality of user terminals 20 connected to a status system 22 via a wide-area computer network 24, such as the Internet.

The user terminals 20 can include personal computers, smartphones, tablet computers, and similar. Each of the user terminals 20 can be configured to execute one or more application programs that interfaces with data stored at the status system 22. An application program may be a purpose-built application or a general user agent application, such as a web browser.

The status system 22 includes at least one processor, memory, and related hardware, such as a network interface. The status system 22 can include one or more computers, servers, or similar electronic devices. The components, data, and other elements described herein regarding the status system are storable in the memory and for execution by the processor for communication to the network via the network interface.

The status system 22 is configured to register accounts for users operating the plurality of terminals 20. Each user account can specify information about the user, such as name, email address, unique ID, media-access control (MAC) address, Internet protocol (IP) address, network address, physical location, residence address, telephone number, or similar. Each user account can specify a user type, such as individual, corporation, charitable organization, school, institution, data entity, or electronic device. A user can be any type of entity, and the types of users applicable to the present invention are not particularly limited. Information contained in a particular account is provided by or for the user. Information may be verified by the status system 22 to obtain a level of validation for the particular account. Example levels of validation include: email address verification, telephone number verification, residence address verification, and name verification. The status system 22 can be configured to perform such verifications by, for example, sending a confirmation email message to the email address, making an automated telephone call to the telephone number, sending an SMS message to the telephone number, triggering the mailing a postcard to the residence address with instructions to verify receipt via a terminal 20, and processing a photograph of a physical form of identification (e.g., driver's license). Various verifications can be mapped to various levels of validation.

Users can be people or organizations, and further users can be data or electronic devices, such as web pages/sites, computers and other machines. That is, a device can assign another user some points, just like a human user can assign points another human user or a company. An example of the former scenario is an Internet-of-Things (IoT) device, such as a thermostat, assigning a homeowner points (e.g., for keeping the temperature setting within reasonable limits). In another example, a web page (i.e., data) can be programmed to assign points to another user (e.g., a person) for performing a certain action at the web page, for example. Numerous other examples are contemplated.

The status system 22 is generally configured to track interaction events between users of the terminals 20. For example, interaction events include social acknowledgements such as a "thank you" from one user to another for a favor, assistance, good deed, demonstration of generosity, altruistic action, or similar. Interaction events are contemplated to be associated with real-world social interactions conducted outside the status system 22, and may be associated with social interactions performable outside computerized social networks in general (e.g., driving a friend to the airport, donating cash, helping a family member through an emotional crisis, etc.). Each interaction event is associated with an interaction indication. Interaction indications may be pre-configured and user selectable and may be accompanied by user-provided data specific to the specific interaction. Different interaction indications for different interaction events can be assigned different values. The status system 22 tracks interaction indications among users of the terminals 20 and accords status to such users based on the underlying values of the interactions.

The status system 22 can be configured to host campaigns for interactions. A campaign can include one or more predefined challenges to users to perform one or more specified types of interactions. A challenge is an interaction event that can include a time range, defined by a specified start time and a specified end time. When a user is assigned an indication of an interaction defined by the campaign, the indication is allocated to the campaign, so that a total number/value of indications can be calculated for the campaign. Campaigns can be restricted to specified users or groups of users (e.g., private) or unrestricted and open to any user of a suitable type (e.g., public). Other kinds of campaigns are also contemplated, with challenges being one example.

The system can further include one or more social network servers 26 connected to the network 24. The social network servers 26 are configured to operate a computerized social network, such as Facebook™, Twitter™, LinkedIn™, and similar. The social network servers 26 and the status system 22 may be configured to communicate in various ways. The status system 22 can be configured to post content to the social network servers 26. The social network servers 26 can be configured to send data to the status system 22 or the status system 22 can be configured to collect data from the social network servers 26. In some examples, the status system 22 uses the social network servers 26 for user profile data, user connections data (e.g., friends, family, etc.), login functionality, or a combination of such. In other examples, the status system 22 forms a fully integrated component of the computerized social network implemented by the social network servers 26. In still other examples, the status system 22 and social network servers 26 do not communicate directly, with information being passed there-between by users at the terminals 20.

Figure 8:
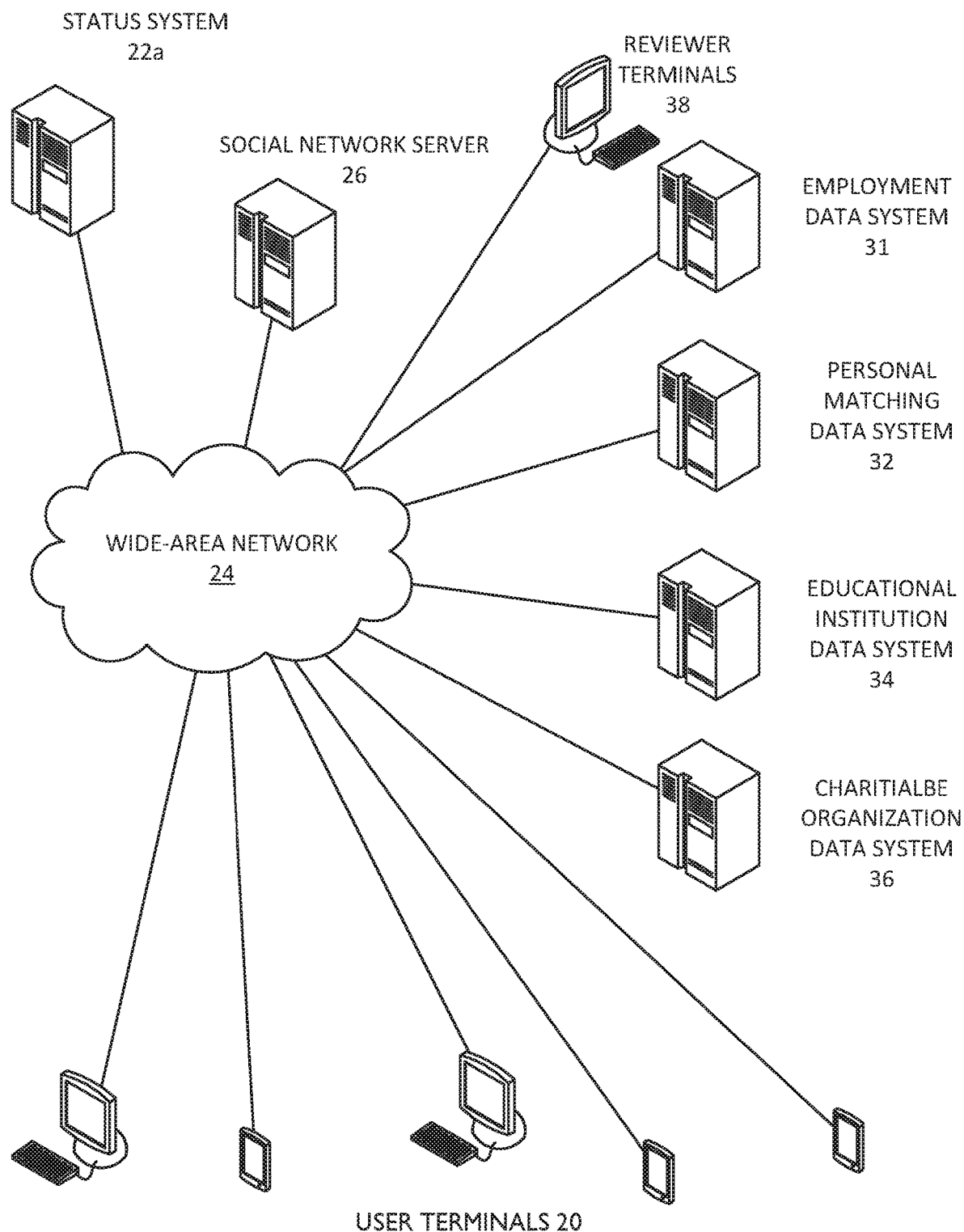
FIG. 8 is a diagram of another system according to the present invention.

The system can further include various external data systems 30 connected to the network 24, such a system operated by a corporation, an educational institution, a charitable organization, and similar. FIG. 8 and related description give examples of various suitable external data systems 31-36. Other examples are also contemplated, and it is expected that various external systems may benefit from social interaction data pertaining to social interactions among a population of users. The external data systems 30 are operated by third parties and can be operated on private networks accessible to only a subset of terminals 20. As will be discussed in detail below, the status system 22 provides useful and reliable data about the users at the terminals 20 to the external data systems 30, so that the external data systems 30, other users of the terminals 20, and/or reviewer terminals specifically associated with the external data systems 30 can make real-world decisions concerning the users at the terminals 20.

The external data systems 30 can advantageously benefit from authentic representations of certain social character (e.g., thankfulness, participation, generosity, kindness, etc.) as generated and provided by the status system 22. As will be further discussed below, the status system 22 remedies technological failings of computerized social networks and thereby facilitates effective real-world decision making based on computer data and promotes efficient use of the network 24.

Figure 2:
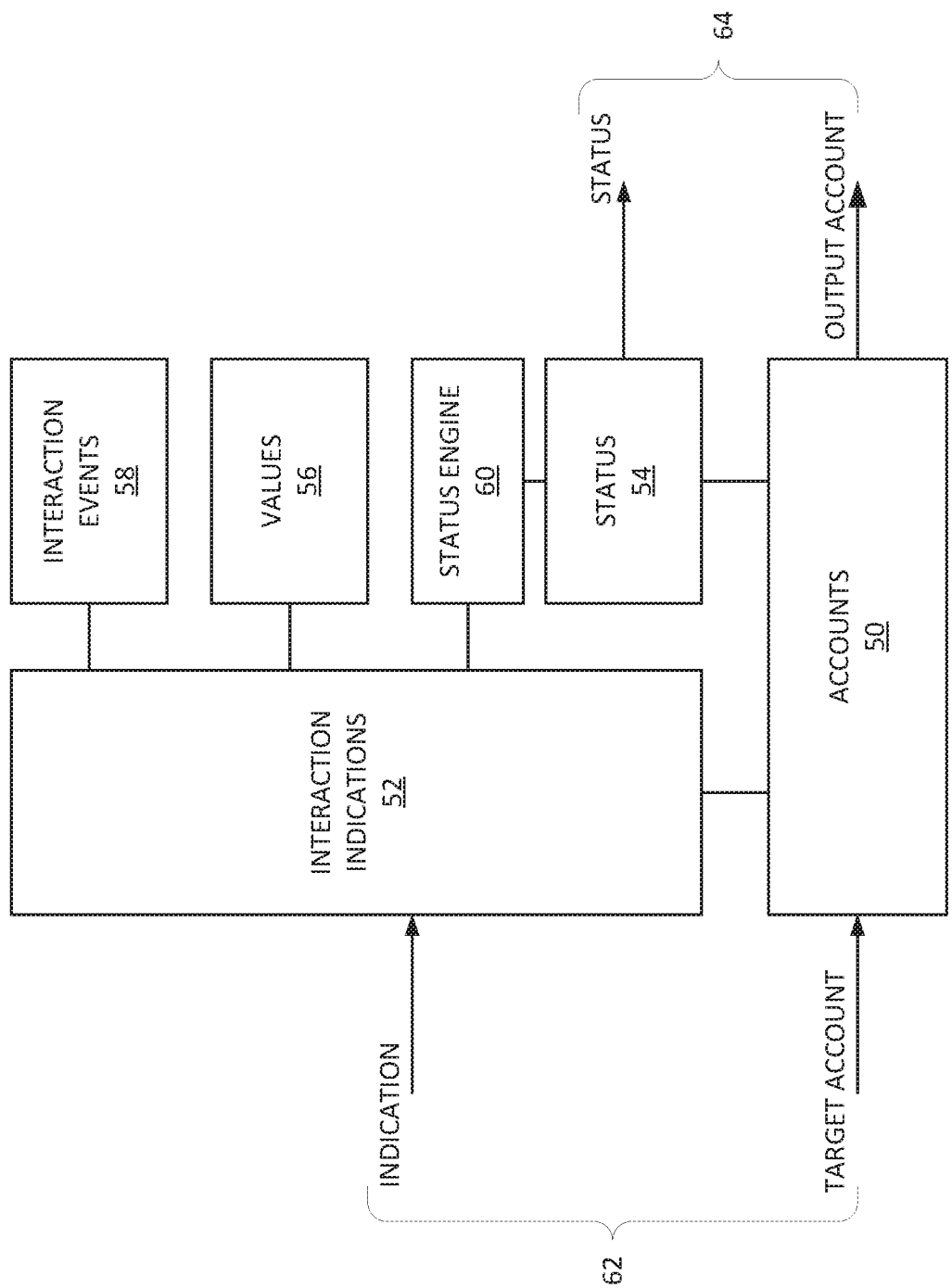
FIG. 2 is a diagram of a data and processing structure for the status system.

FIG. 2 shows an example data and processing structure for the status system 22. The data structure may be implemented as tables in relational database, as files in a file-based database, similar data store, or generally in memory controlled by the status system 22. Processing is executed by a processor of the status system 22 using the data structure.

The system maintains user accounts data 50 that stores unique user identifiers (ID) and may store names and other personal data, discussed above. Accounts 50 are accessible via user terminals 20.

Each user account is associated with a status 54 that can be a single data element that is provided by the status system 22 to other users or to external data systems 30 as a representation of the social character, generosity, ranking, or similar characteristic for the particular user account. The status 54 is computed based on interaction indications 52 and values 56 as will be discussed below. Further, the status computation is limited to prevent gaming/abuse of the status system 22.

Interaction indications 52 are stored in association with interaction events 58 that can occur among users of the accounts. Examples of different interaction events include interactions on social media, such as via the social network server 26; interactions via external data systems 30, such as those operated by charitable organizations, workplaces, and similar; and real-world events (e.g., favors, face-to-face communications, assistance, etc.) that are outside of the computer system.

Each interaction indication 52 is associated with at least a stored or computed value 56. A particular value is a numerical or quantitative expression of the magnitude of the interaction or acknowledgement (e.g., 5, 10, 25, "low", "medium", "high", etc.), where larger values represent a higher degree of interaction (e.g., greater level of gratitude, participation, etc.). If non-numerical values are used, they are paired with numerical values for use during numerical computations. For a particular interaction, a user may be an originator (e.g., the person/organization expressing thanks or gratitude, an organizer of an event, etc.) or a receiver (e.g., the person/organization receiving thanks or gratitude, the participant in an event, etc.). Published PCT application WO 2014/056084 can be referenced for further detail and examples of interactions, acknowledgements, and related values.

Interaction values 56 can be calculated based on contributing factors, such as effort and impact. A matrix of such factors can be pre-set for calculation of interaction values 56. In one example, each interaction value 56 is computed as an effort factor multiplied by an impact factor.

Interaction indications 52 are accumulated for accounts 50 and tie the values 56 of various interaction events 58 to the statuses 54 of the accounts 50. A status engine 60 is provided to compute statuses 54 based on at least interaction indications 52 and values 56.

In operation, interaction indications for target accounts are received, as data messages 62, via the computer network 24 from the user terminals 20. Each received interaction indication 52 identifies a target account 50 and is stored in association with such account 50.

For each account, the status engine 60 collects a set of interaction indications 52 identifying various interaction events 58 and identifying the account, looks up the values 56 of the interaction indications 52 of the set, and combines the values 56 using a limiting function to determine the status 54 of the account. The limiting function is configured to accumulate the values 56 of the set into an accumulated value and progressively limits the accumulated value as an increasing number of interaction indications for the set are received. That is, for a particular target account 50, interaction indications 52 are received, and the associated values 56 are passed to the limiting function, which computes the status 54 of the particular target account 50.

The limiting function can be configured to be constrained by originating account, interaction event, and similar factors. That is, the limiting effect can be dependent on, for example, originating account, so that interaction indications from different originating accounts have contributions to status limited independently. For instance, for a particular target account, if one interaction indication is received from a first account and another interaction indication is received from a second account, the effect of the second interaction indication is not reduced. However, the effect of a further interaction indication from the first or second account may be reduced. The same can be applied to different interaction events, so that further interaction indications for one kind of interaction event are limited independently of interaction indications received for another kind of interaction event. For instance, the effects of social media "likes" are moderated independently to the effects of interactions made in the real world. The limiting function can be configured to be constrained globally for all accounts by, for example, a hard maximum that is fixed or settable by an admin.

An indication of the status of any account can be outputted as a data message or other output object 64. The data message or output object 64 can be transmitted by the status system for display at any user terminal 20. Such transmission can be via the social network server 26 or other external data system 30. The social network server 26 or other external data system 30 can serve context for the status provided by the status system 22.

In some examples, a status is a numerical score that indicates a social characteristic of the user, such as helpfulness, willingness to participate, an amount of assistance given to others, or any of the other examples given herein. The status can be interpreted as a level of gratitude shown to such user. The status can be a blending of various characteristics. The status benefits the social network server 26 or the external data system 30 as it can be used to direct traffic among users in an automated or manual way. That is, communications can be directed to an account with a particular status (e.g., a high numerical value) on the expectation that the user of the account will be responsive to such communications. Conversely, communications can be avoided with an account of different status (e.g., a lower numerical value) on the expectation that the user will not be responsive to such communications. Hence, the technical problem of improving network traffic is at least partially solved and it is an advantage of the invention that greater efficiency in the computer network is possible.

Figure 3:
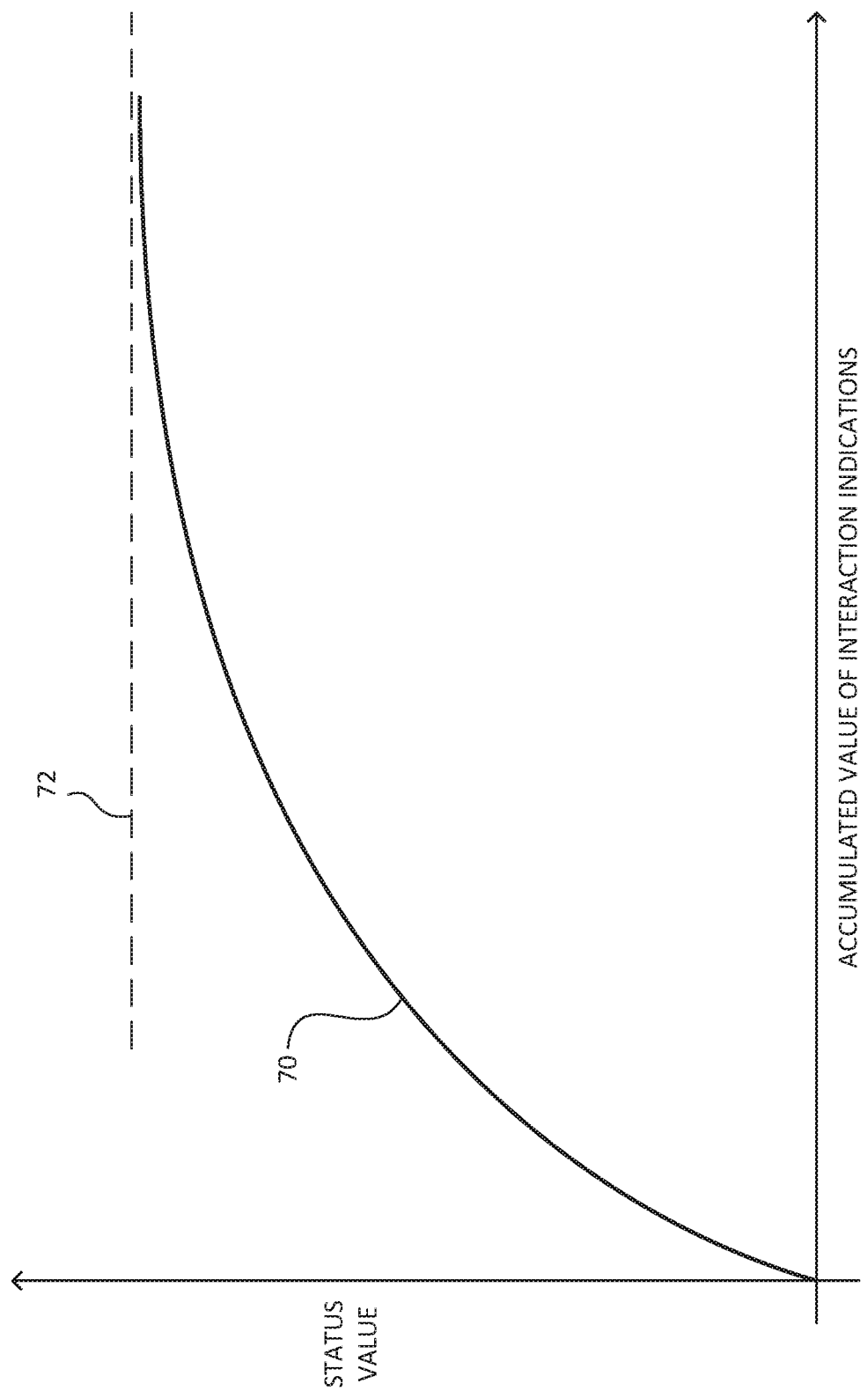
FIG. 3 is a diagram of a limiting function.

As shown in FIG. 3, the limiting function can include a logarithmic function 70 taking accumulated values of interaction indications as input and outputting a value of status. The logarithmic function 70 can be configured with an asymptote 72 at which further interaction indications do not contribute (or contribute only minimally) to status value. Thus, a first interaction indication designating a target account increases status by a relatively large value, a second interaction indication of relatively equal or lesser value of the first interaction and designating the target account increases the status by a relatively lesser value, and so on until further interaction indications reach a ceiling and have negligible further effect on status.

The limiting function can further include exclusions that are not considered when determining status. An example of such an exclusion is a threshold number of interaction indications received from another account over a set time period. Interaction indications exceeding the threshold are ignored. In one example, only two interaction indications designating the target account and received from the same source account during one day are considered as contributing to the status of the target account.

Figure 4:
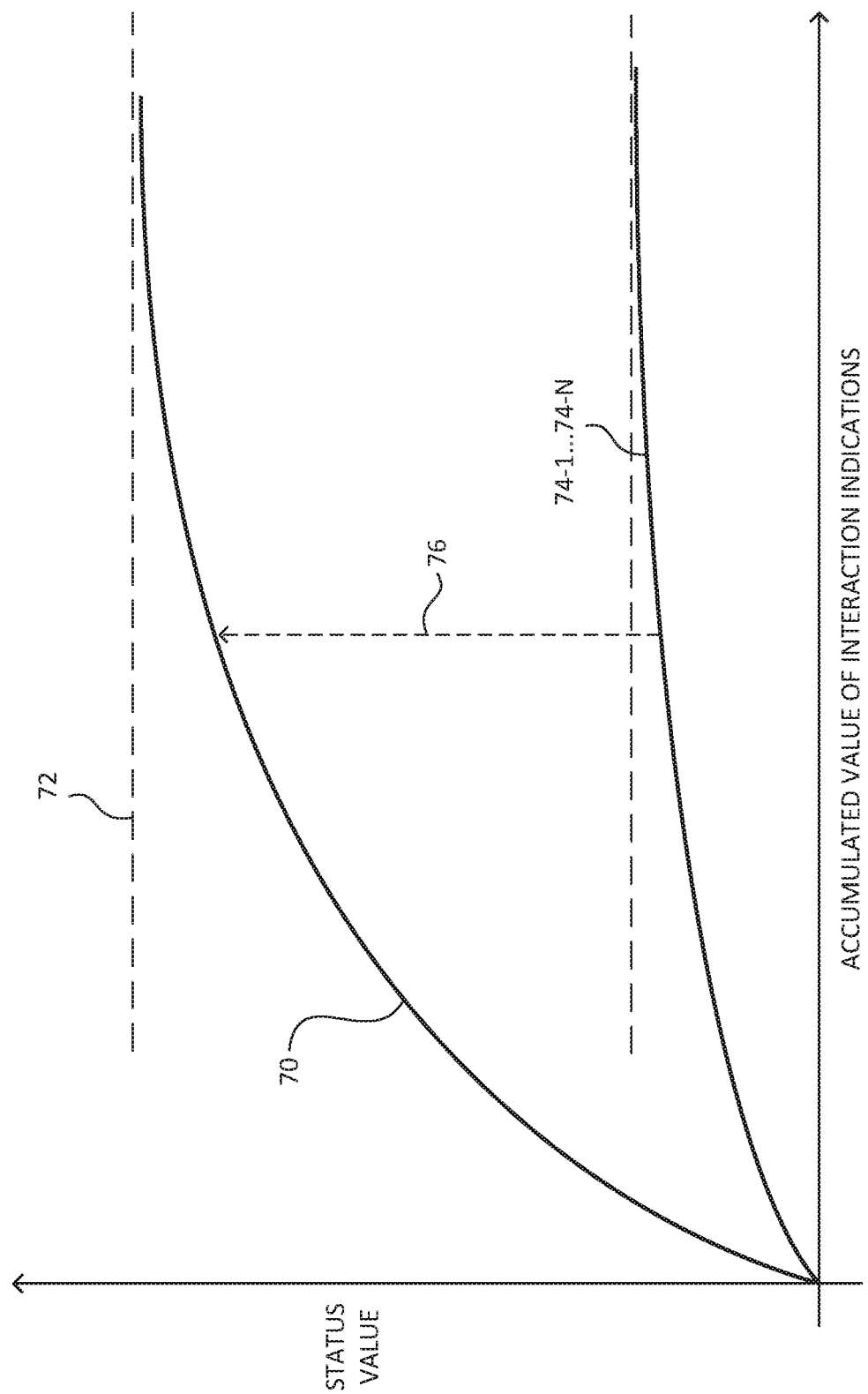
FIG. 4 is a diagram of subset limiting functions contributing to a limiting function.

As shown in FIG. 4, the limiting function can include a plurality of subset limiting functions 74-1-74-N applied to subsets of the set of interaction indications. Each subset of interaction indications can be related to a different interaction event. The values of the subset limiting functions 74-1-74-N can be combined 76 (e.g., summed with/without weighting). Each of the subset limiting functions 74-1-74-N can have an asymptotically limited ceiling. In one example, each of the subset limiting functions 74-1-74-N is configured for a social media interaction, a real-world interaction, an interaction occurring via an external data system 30, and similar. That is, the subset limiting function 74-1 is applied to expressions of gratitude received via a particular social network, the subset limiting function 74-2 is applied to "likes" received via a different social network, a subset limiting function 74-3 is applied to photographs showing real-world events uploaded to the status system 22, and so on.

Figure 5:
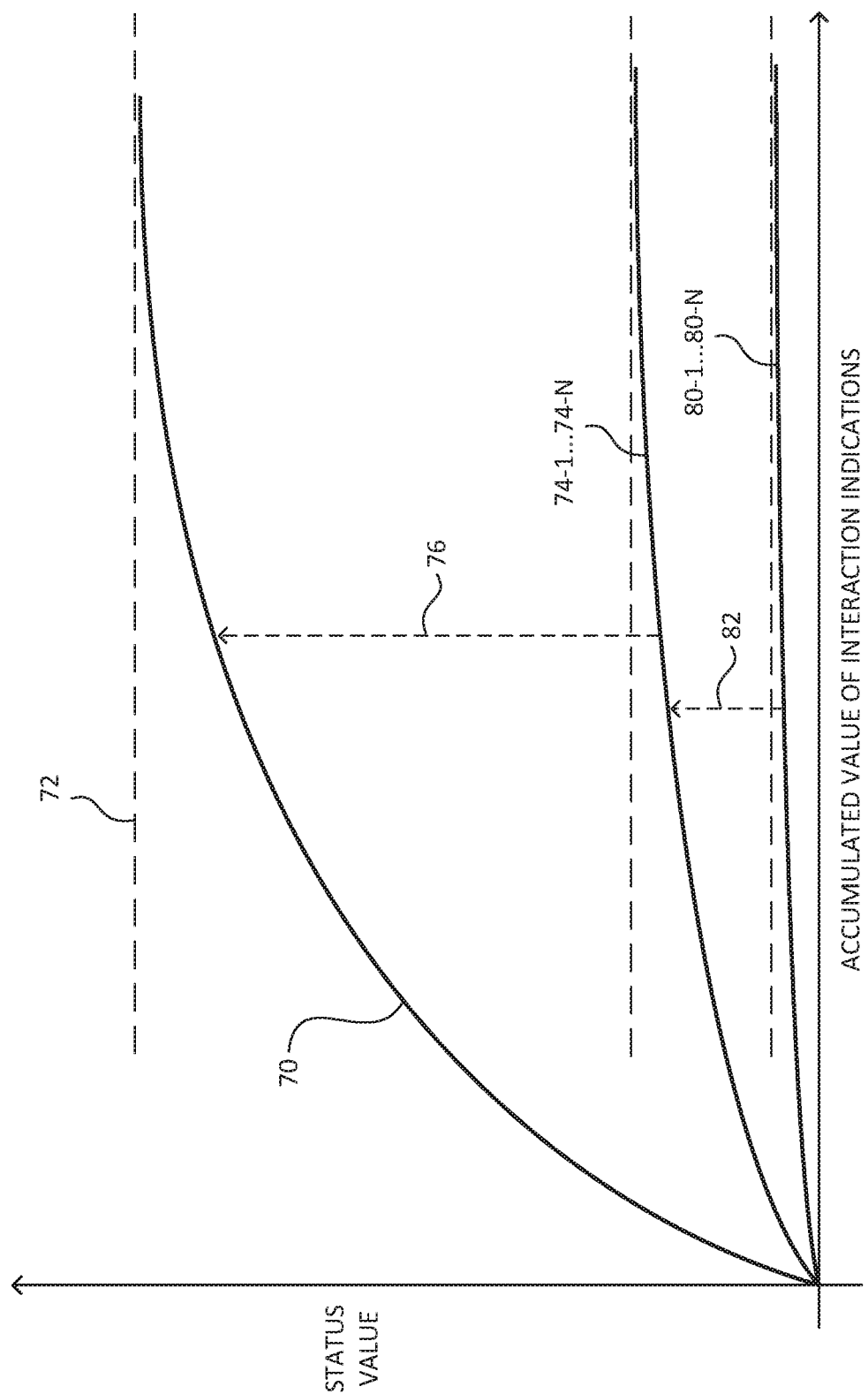
FIG. 5 is a diagram of type limiting functions forming subset limiting functions, which contribute to a limiting function.

As shown in FIG. 5, one or more of the of subset limiting functions 74-1-74-N can be based on a plurality of type limiting functions 80-1-80-N applied to different types of interaction indications related to the respective interaction event underlying the subset limiting function. The values of the type limiting functions 80-1-80-N can be combined 82 (e.g., summed with/without weighting). Each of the type limiting functions 80-1-80-N can be a logarithmic function and can have an asymptotically limited ceiling. In one example, a type limiting function 80-1 applies to expressions of gratitude received via a particular social network tagged with a specific tag (e.g., a hashtag), another type limiting function 80-2 applies to expressions of gratitude received via a particular social network tagged with a different tag, and so on. Further, each limiting function 80-1-80-N can itself be composed of a plurality of limiting functions.

Figure 6:
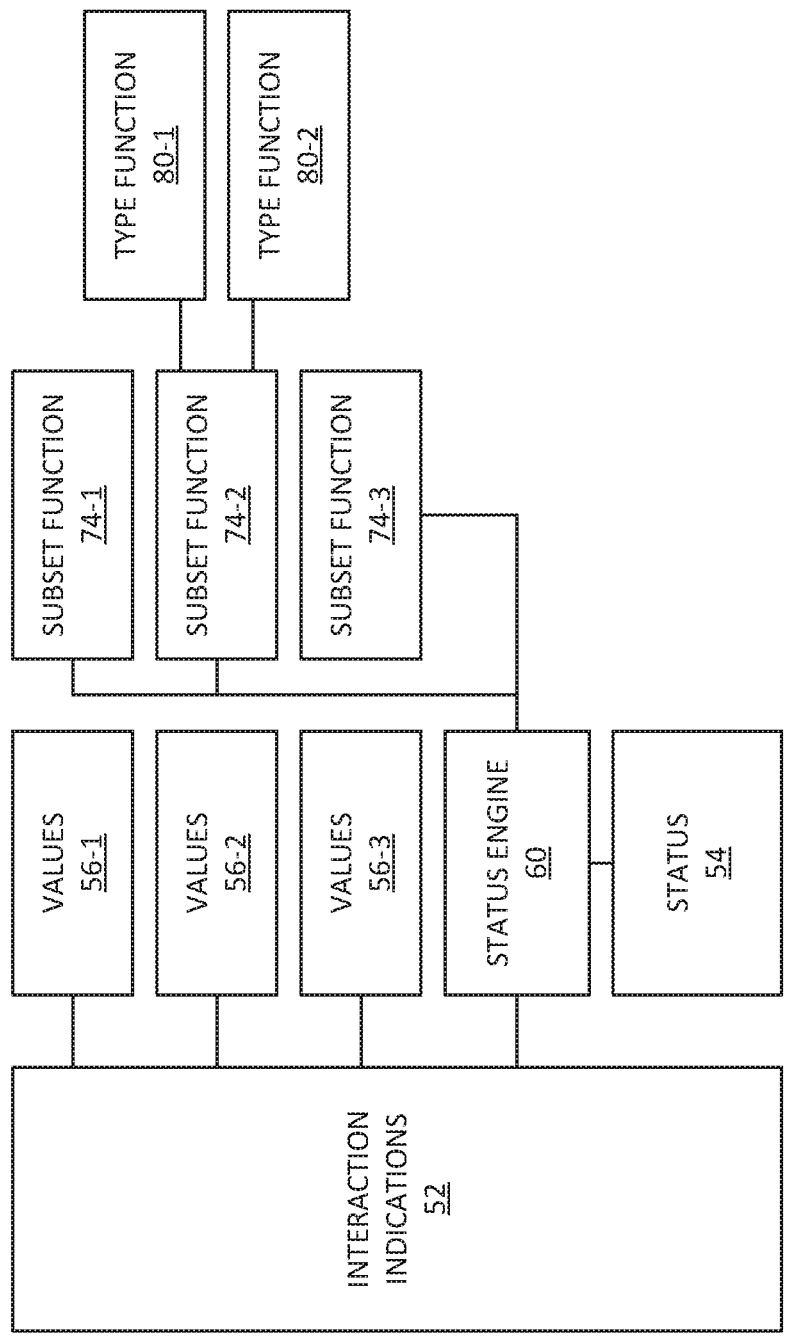
FIG. 6 is a diagram of another data and processing structure.

FIG. 6 shows an example data and processing structure for the status system 22 similar to that shown in FIG. 2. Other components shown in FIG. 2 are omitted from FIG. 6 for clarity and only differences are discussed in detail.

Three subset limiting functions 74-1-74-3 are configured for three different interaction events. Each interaction event is assigned a specific interaction indication 52 that is associated with one or more values 56-1-56-3. A first group of one or more values 56-1 is associated with an interaction indication 52 for a particular interaction event, a second group of one or more values 56-2 is associated with an interaction indication 52 for different interaction event, and a third group of one or more values 56-3 is associated with an interaction indication 52 for a yet another interaction event. One of the subset limiting functions 74-2 includes two type limiting functions 80-1 and 80-2, each of which is assigned to a different type of interaction for the interaction event forming the basis for the subset limiting function 74-2.

Any of the logarithmic functions discussed herein can generally be expressed as:

$$x = M * i^S + D$$

where:
M is a selectable coefficient,
i is the value assigned to the interaction indication or type of interaction indication,
S is a selectable slope value,
D is an initial modifier value, and x is the contribution (or points added) to the status value, and where x is limited to a ceiling value.

Combining 76, 82 more than one of the logarithmic functions discussed herein can be expressed as to obtain a status value:

$$X_0 = \Sigma_{u=1, v=1}^{U,V} x_{uv}$$

where:
x is the contribution (or points added) to the status value of a particular type, v, of interaction indication for different interaction events, u, and
$X_0$ is the status value (or score).

As should be apparent, the calculation behind status is also not readily derivable by testing/observation, but is intuitive to users.

Figure 7:
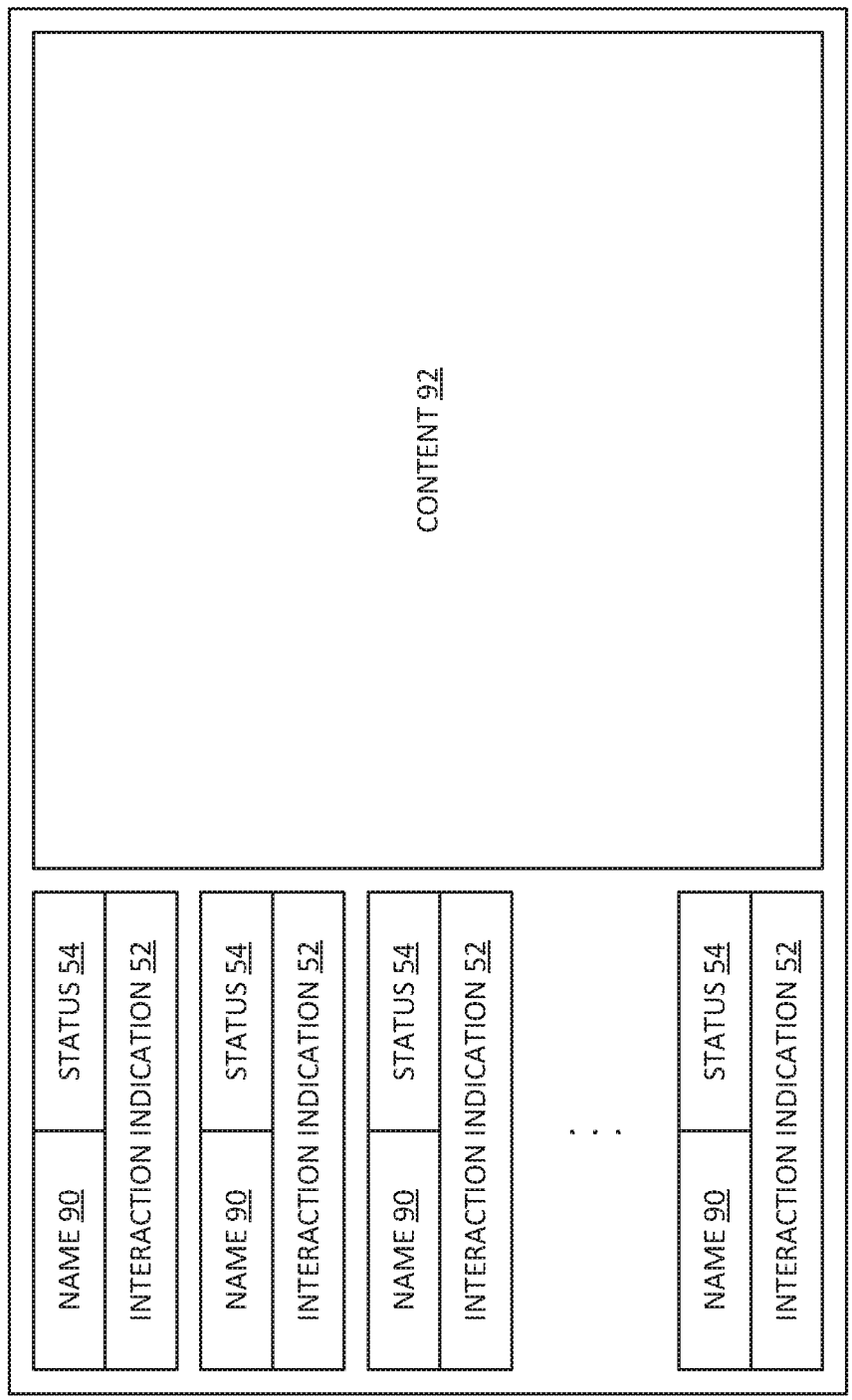
FIG. 7 is a diagram of a user interface showing status.

FIG. 7 shows a user interface of a terminal 20, such as a web browser or similar, for displaying status in context. Content 92 can be provided by the social network server 26 or an external data system 30. Example content includes content related to charitable campaigns, organizational activities, or similar. Information concerning users who have donated, volunteers, participated, etc. can be presented. Names 90 (or other identities) of users, obtained from the status system 22, the social network server 26, or the external data system 30, can be shown in association with statuses 54 as obtained from the status system 22. One or more selected interaction indications can also be shown in association with each name 90, the selected interaction indications being the most recent, the highest value, or according with some other criteria.

FIG. 8 shows a diagram of another status system 22a according to the present invention. Features and aspects discussed above can be used for this system 22a, and features and aspects discussed below can be used with the system 22 described above. Like reference numerals denote like components and the above description can be referenced for further detail.

The status system 22a is generally configured to track indications of interaction events between users of the network-connected terminals 20. For example, interactions include indications of "thank you" from one user to another for a favor, assistance, good deed, demonstration of generosity, altruistic action, or similar. Interactions are contemplated to be associated with social interactions conducted outside the status system 22a, and may be associated with social interactions performable outside computerized social networks in general (e.g., driving a friend to the airport, donating cash, helping a family member through an emotional crisis, etc.). Each interaction is associated with an identifier for the social interaction. Identifiers may be generic, freeform user-entered data, based on predetermined categories that may be user selected, or a combination of such. The status system 22a tracks interactions pertaining to certain social behaviour, such as generosity and kindness, among users of the terminal 20 and hence indirectly tracks such certain social behaviour. The status system 22a and the status system 22 discussed above can be combined into the same system.

The system can further include various external data systems connected to the network 24, such as an employment data system 31, a personal matching data system 32 (e.g., dating web site), an educational institution data system 34, and a charitable organization data system 36 to name a few examples. Another example is an ad service, such as Google AdWords™, which can reference user status when serving advertisements. Other examples are also contemplated, and it is expected that various external systems may benefit from interaction data pertaining to social interactions among a population of users. The external data systems 31-36 are operated by third parties. As will be discussed in detail below, the status system 22a provides useful and reliable data, such as status, about the users at the terminals 20 to the external data systems 31-36, so that the external data systems 31-36, other users of the terminals 20, and/or reviewers at terminals 38 specifically associated with the external data systems 31-36 can make real-world decisions concerning the users at the terminals 20. Examples of operators of terminals 20, 38 who may make such decisions (e.g., by referencing status) include a recruiter or employer evaluating a user for employment suitability, a potential romantic partner evaluating a user for desirable characteristics, a school evaluating a user for suitability as a student, a charity evaluating the user for suitability as a volunteer or worker. The external data systems 31-36 may be programed to make similar decisions in an automated manner in addition or as an alternative to decisions made by operators at terminals 20, 38. For example, a personal matching data system 32 may filter out potential matches based on data received from the status system 22a. Data communication may be made via one or more application programming interfaces or data feeds of the external data systems 31-36 and/or the status system 22a. Human operator decisions may be facilitated by the external data systems 31-36 pulling data from an exposed data source at the status system 22a to display indications of interactions to operators of terminals 20, 38.

The external data systems 31-36 can advantageously benefit from authentic representations of certain social behaviour (e.g., thankfulness, generosity, kindness, etc.) as generated and provided by the status system 22a. As will be further discussed below, the status system 22a remedies technological failings of computerized social networks and thereby facilitates effective real-world decision making based on computer data.

Figure 9:
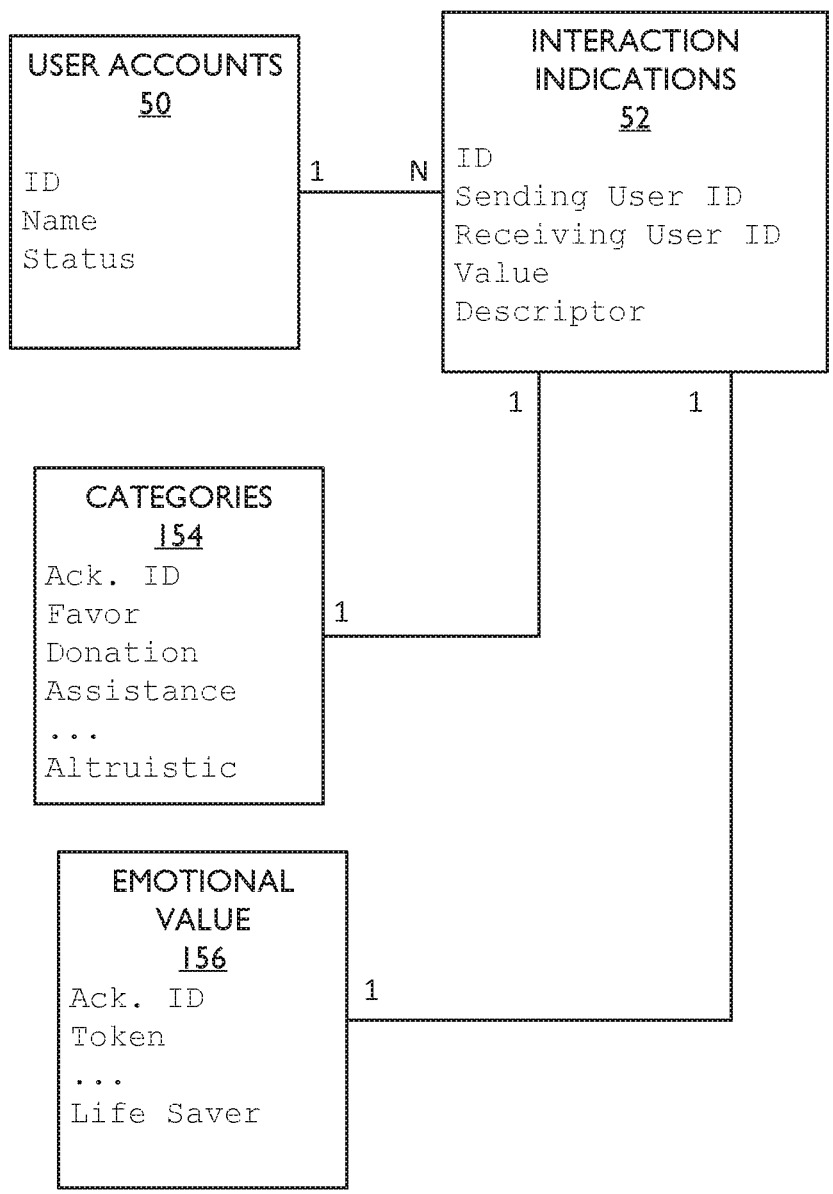
FIG. 9 is a diagram of another data structure.

FIG. 9 shows an example data structure for the status system 22a. The data structure may be implemented as tables in relational database, as files in a file-based database, or similar data store controlled by the status system 22a. User accounts data 50 stores unique user identifiers (ID), names, and other personal data. User accounts data 50 further stores a status for each user. The status is a single data element that can be provided by the status system 22a to other users or to external data systems 31-36 as a representation of the authenticity of social interactions for a particular user account.

User accounts data 50 has a one-to-many relationship with interaction indications 52 for particular social interactions among users of the accounts. A particular interaction value is a numerical or quantitative expression of the magnitude of the acknowledgement (e.g., 5, 10, 25, "low", "medium", "high", etc.), where larger values represent a higher degree of interaction (e.g., greater level of gratitude, acknowledgement). If non-numerical values are used, they are paired with numerical values for computation. For a particular interaction value, a user may be a sender of the interaction (e.g., the person expressing thanks, gratitude, etc.) or receiver of the interaction indication (e.g., the person receiving thanks, gratitude, etc.). A descriptor may be provided for each interaction indication and the descriptor may include freeform text or other enterable or selectable identifier for expressing the nature of the indication and underlying social interaction event (e.g., "Thanks for shovelling the snow"). Published PCT application WO 2014/056084 can be referenced for further detail and examples of interaction indications and related values.

Interaction indications 52 may be provided with a one-to-one relationship to each of categories data 154 and emotional value data 156. Categories data 154 designate predetermined selectable categories to identify interaction indications 52 and underlying social interactions, such as "act of kindness", "favor", "donation", "volunteer", and "good deed", etc. Selectable categories may be provided with underlying numerical values for data processing. Selectable categories advantageously allow for fine-grained processing of interaction indications 52 without having to parse human-entered descriptors. Emotional value data 156 designate predetermined selectable expressions to identify the impact that the social interaction had on the sender of an interaction indication. Examples of quantized emotional value data 156 include "token", "appreciative", "couldn't have done it without you", "live saver", etc. Quantized emotional values may be provided with underlying numerical values for data processing and, similar to the selectable categories, advantageously allow for fine-grained processing of interaction indications 52 without having to parse human-entered descriptors.

Figure 10:
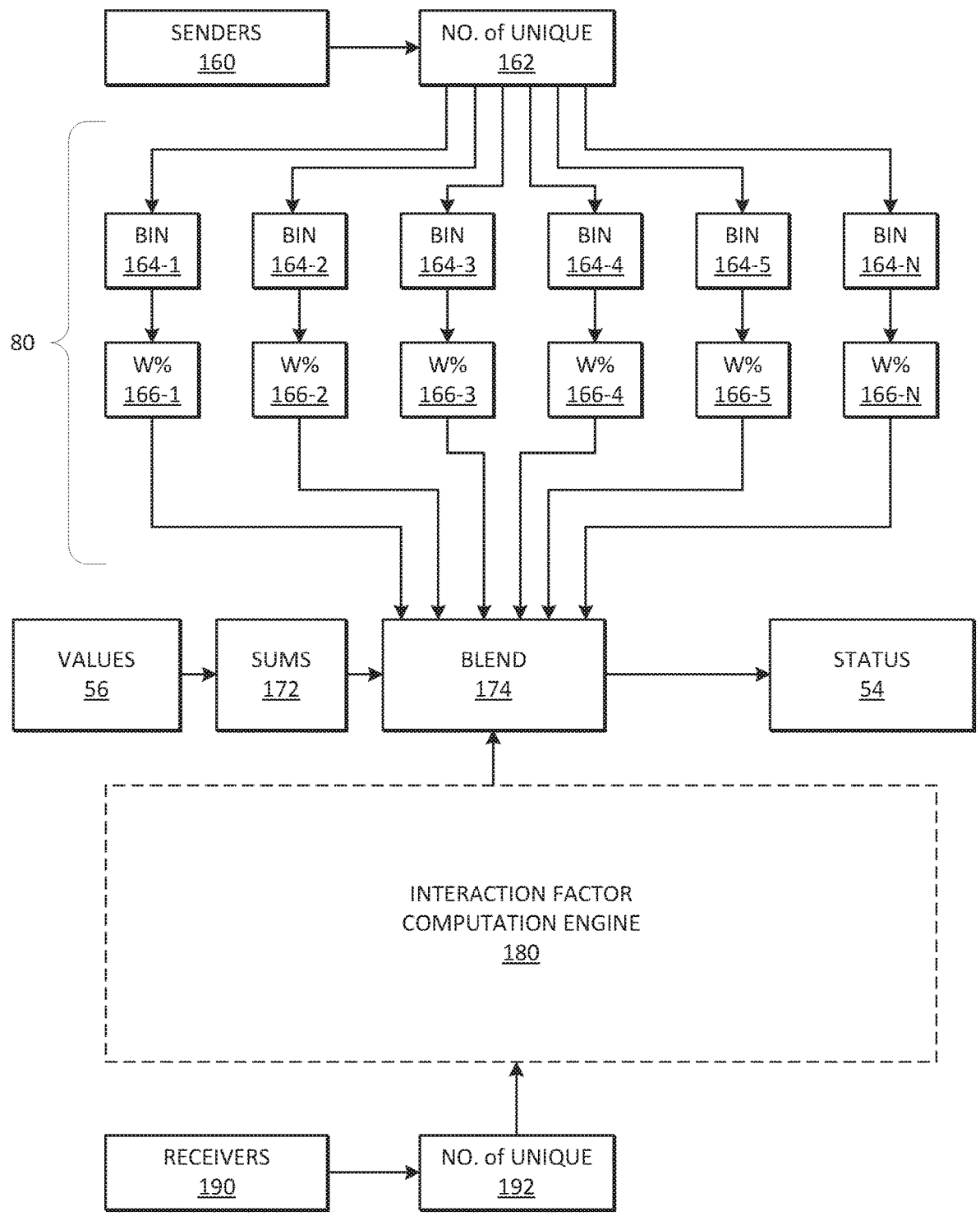
FIG. 10 is a diagram of a status computation.

FIG. 10 shows a computation of status 54 for particular user account. Sender accounts 160 of interaction indications are processed to count a number 162 of unique sender accounts linked to the particular account by the sending of an interaction indication to the particular account. That is, a quantity of unique accounts that sent an interaction indication to the user of the particular account is determined. This number 162 is representative of a number of unique users indicating an interaction with the particular user under consideration.

The number 162 is then assigned to one of a predetermined quantity of bins 164-1-164-N based on threshold numbers, where bin 164-N is open-ended and captures any number that exceeds its threshold number. Each bin is assigned to a factor 166-1-166-N (or weight) used to compute the status 54. Received interaction indication values 56 for the particular user account are summed and total 172 is multiplied by the factor 166-1-166-N corresponding to the bin 164-1-164-N into which the number 162 of unique sender accounts landed. The weighted total can be blended 174 with other values before being outputted as the status 54.

Example thresholds and weightings for bins 164-1-164-N are shown in Table 1 below.

TABLE 1

| Bins (N = 6) | Threshold number(s) of unique sender accounts | Factor (166-1-166-N) |
|---|---|---|
| 164-1 | 1 | 10% |
| 164-2 | >1 and <=3 | 25% |
| 164-3 | >3 and <=7 | 50% |
| 164-4 | >7 and <=15 | 75% |
| 164-5 | >15 and <=24 | 90% |
| 164-6 | >24 | 100% |

In the example of Table 1, the sum of values 56 for sent interaction indications count towards the receiving user's status 54 if those values 56 are from more than 24 unique senders. If there are not more than 24 unique senders but there are more than 15 unique senders, then 90% of the sum of the values 56 count. The proportion of the sum of the values decreases as the number of unique senders decreases.

This advantageously attenuates the value of interaction indications received from a small group of users (or just one user), while amplifying the value of interaction indications received from a wider spectrum of users. For the same total value, a wider array of other users results in higher status 54. A further benefit is that the open-ended bin 164-N associated with the highest factor 166-N removes potentially unbounded increases in status due to an unusually wide social circle or a high degree of media presence (e.g., a celebrity's account).

The array of bins bin 164-1-164-N and factors 166-1-166-N can be termed an interaction factor computation engine 180 that takes an input of a number of user accounts meeting some criterion and outputs a weighting to apply to a respective sum of values 56. The blending function 174 can be configured to sum outputs of different interaction factor computation engines 180 of different criteria to compute the status. Other factors may also be inputted into the blending function 174, and the blending function 174 may be configured to output a normalized value (e.g., 0-100) as the status.

The criterion discussed above is the number of unique senders of acknowledgments to a particular user whose status is being computed. Another criterion shown in FIG. 10 is a number 192 of unique receiver accounts 190 of acknowledgments from the particular user. This number 192 is representative of a number of unique users receiving expressions of gratitude from the particular user under consideration. A suitable interaction factor computation engine 180 for receivers can be configured. The same bins and factors as shown in Table 1 can be used or different bins and factors can be used. A sum 172 of sent interaction values 56 is modified by the output of the engine 180. The blending function 174 can be configured with factors for each engine 180 used. For example, the output of the engine 180 that computes factors based on unique senders can be weighted at 50% and the output of the engine 180 that computes factors based on unique receivers can be weighted at 50%.

As with the unique senders, the proportion of the sum of the interaction values decreases as the number of unique receivers decreases. This advantageously attenuates the value of interactions sent to a small group of people (or just one person), while amplifying the value of interactions sent to a wider group of people. That is, for the same total value, a wider array of other users contributes to a higher status. When counting unique receivers, the open-ended bin 164-N associated with the highest factor 166-N removes potentially unbounded increases in status due to unusually prolific activity by the particular user whose status is being computed and who may be attempting to game the system by sending a multitude of small interaction indications to distant acquaintances.

Processing the numbers of unique senders and receivers of interaction indications in this manner to arrive at the status advantageously increases the difficulty of "gaming" the status system 22a and increases the authenticity and credibility of a status. This can advantageously encourage external data systems and other users to place a high degree of confidence in the status of a particular user of interest. If, for example, a user claims to be an active volunteer, then external data systems and other users would expect to see a relatively high status for such user. A user cannot easily exploit the system by trading "empty" acknowledgements with a few friends. Nor can a user make a few high-value but perhaps genuine acknowledgements to quickly boost his or her status. Hence, the status is more reflective of the user's personality, ethics, and personal values than other known statuses or ratings.

Figure 11:
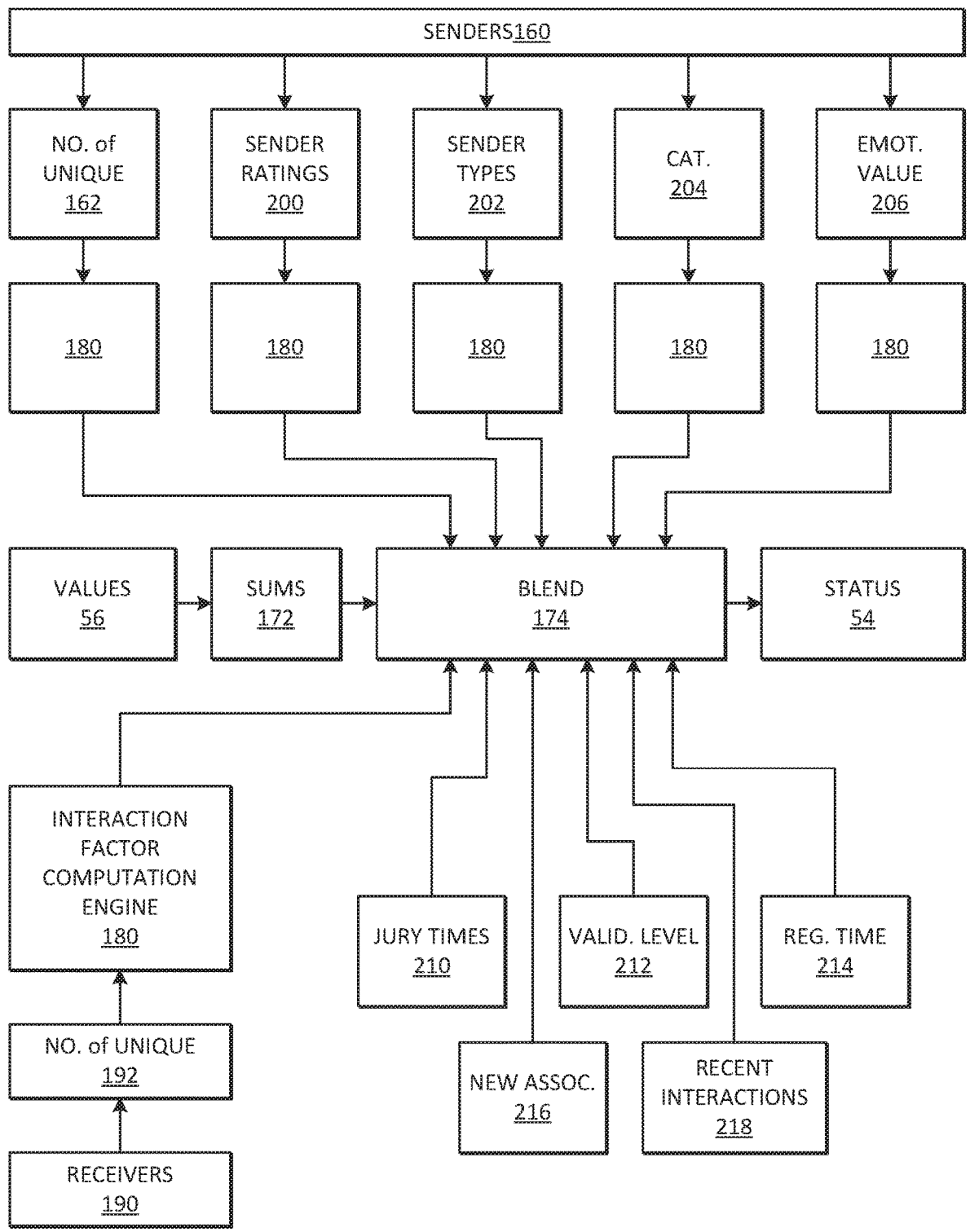
FIG. 11 is a diagram of another status computation.

FIG. 11 shows another computation of a status for particular user account. Various interaction factor computation engines 180 are employed for various different criteria. The numbers 162, 192 of unique sender and receiver accounts are blended with output of interaction factor computation engines 180 for the additional criteria of sender statuses 200 and sender user types 202.

Sender statuses 200 specify a number of user accounts that have sent the particular user an interaction indication, where each of such user accounts meets or exceeds a threshold status 54. The engine 180 can be configured match this number to a bin and obtain the associated factor, as discussed above. For example, the threshold may count a number of accounts having a status of more than, for example, 75 who have given the particular user an interaction indication. The engine 180 than matches this number to an associated factor, which modifies a respective sum 172 of received interaction indication values 56. More than one such threshold can be used resulting in more than one number that is fed into a differently configured engine 180. This advantageously awards the particular user account whose status 54 is being computed a higher value based on interaction indications received from high status users.

Sender user types 202 specify a number of user accounts that have sent the particular user an interaction indication, where each of such user accounts is of a matched user type, such as individual, corporation, and charitable organization. The associated engine 180 can be configured match this number to a bin and obtain the associated factor, as discussed above. For example, a matching criterion may count a number of accounts having a user type of, for example, "charitable organization" who have given the particular user an interaction indication. The engine 180 than matches this number to an associated factor, which modifies a respective sum 172 of received interaction indication values 56. More than one such matching criterion can be used for different user types resulting in more than one number that is fed into a differently configured engine 180. This advantageously awards the particular user account whose status 54 is being computed a higher value based on the type of users who have given interaction indications. It is contemplated that interaction indications from charitable organizations can have higher factors than interaction indications from corporations, who in turn can have higher factors than interaction indications from individuals.

Hence, in addition to numbers of unique senders and receivers of interactions, sender status and sender types can increase the authenticity and credibility of the status of the user. For example, it is unlikely that a high status user or a user associated with a charitable organization or corporation will engage in gaming techniques to falsely inflate the statuses of others. Thus, inbound interaction indications from such accounts can be weighted more heavily.

FIG. 11 shows further criteria that may be used when computing the status 54, including category 204 of received interaction indication and quantized emotional value 206 of received interaction indication. One or more suitable configured interaction factor computation engines 180 are provided to determine at least one relevant factor, which modifies a respective sum 172 of received values 56. A number of interaction indications received in a particular category 204 can be assigned to a bin and a resulting factor can be obtained. Similarly a number of interaction indications received as having a particular quantized emotional value 206 can be assigned to a bin and a resulting factor can be obtained. Various different categories 204 and quantized emotional values 206 can be processed in the same way. Any combination of category 204, quantized emotional value 206, both, or neither can be implemented.

Additional factors are shown in FIG. 11 and any of these may be referenced when computing the status 54 of a particular user account. A number of times 210 that the particular account has been selected to adjudicate interaction indications unassociated with the particular account can be determined and taken to contribute to the status 54. When an interaction indication's value, category, or quantized emotional value between two users is disputed by one of such users, the system 22a may be configured to permit a jury of other users to decide the interaction indication's value, category, or quantized emotional value. The number of times 210 that the particular account has been selected to be on such a jury adds to the status 54 of the particular account, in that the user of the particular account is perceived by other users as trustworthy and fair.

A level of validation 212 of the particular account can be taken to contribute to the status 54. A higher level of validation increases the status 54, in that users who make the effort to validate themselves are less likely to game the system 22a.

A registration time 214 of the particular account can be taken to contribute to the status 54. A longer time since registration validation increases the status 54, in that users who use the system 22a for a longer period of time are less likely to be attempting to game the system.

Recency of activity of the particular account can also be taken to contribute to the status 54. A number of accounts newly associated 216 with the particular account and/or a number of recent interaction indications 218 between the particular account and other accounts are examples of measure of recent activity. A threshold time for newly associated accounts can be set to, for example, 30 days so that only newly associated accounts within the past 30 days increase the status 54. For recent interaction indications 218, a number of days within a past number of days (e.g., 30) with at least one interaction indication can be the basis for an increase of the status 54.

Another criterion is a total number of accounts associated with the particular account. This is similar to the number of accounts newly associated 216, but does not reference a threshold time. A larger number of associated accounts increases the status 54.

The blending function 174 can be configured to weigh the contributions of each considered criterion and output a status 54. One example of blending weights is shown in Table 2 below.

TABLE 2

| Criterion | Source/Units | Weight |
|---|---|---|
| Number of unique senders 162 | Table 1 | 25% |
| Number of unique receivers 192 | Table 1 | 25% |
| Time since registration 214 | days | 5% |
| Total number of accounts associated | count | 5% |
| Number of accounts newly associated 216 | count in threshold time range | 15% |
| Number of recent interactions 218 | count in threshold time range | 20% |
| Number of times as juror 210 | count | 5% |

In this example, for numbers of unique senders and receivers, Table 1 is referenced to determine a factor by which the respective total value of associated interaction indications is multiplied. For the other contributions, each number of units is multiplied by the respective weight.

In a numerical example, suppose that a particular user has received interaction indications from 10 users where such received values sum to 180. The particular user has sent interaction indications to 3 users with a total sent value of 20. Referring to Table 1, which is taken as the configuration of both engines 180, the sent factor is 75% and the received factor is 25%. The user's received status contribution becomes 60 (=80*75%) and the user's sent status contribution becomes 5 (=20*25%). Assuming time other considered criterion results in a value of 24, the user's status becomes 28.25 (=60*25%+5*25%+24*50%).

An indication of the status 54 can be output to any terminal 20, 38 as for example the computed number itself or as an icon/image selected from a plurality of icons/images mapped to various values of status 54. The indication of the status 54 can be outputted as part of a user's profile on the system 22a or on a social network or other system (e.g., dating web site) as a representation of an authenticity of social interactions for the user.

In view of the above, it should be apparent that the present invention has numerous advantages and solves at least one of the problems, including a technical problem, found in the prior art. It should be apparent that the present invention offers techniques for increasing the authenticity and credibility of user status and self-representations in the real world, in computerized social networks, and in other computer systems. This is particularly apparent with the systems described herein that compute status and track interaction indications (e.g., "thank your", gratitude, acknowledgements, etc.) for real-world or other social interactions. A user that purports to be socially active in a specific and arguably positive way, can beneficially support this assertion with a status that is difficult to "game" or exploit due at least in part to the limiting function(s) and the computation involving unique senders and/or receivers of interaction indications. Parties interested in a user's habits, personality traits, values, etc. can give deference to the statuses described herein because of the difficulty in "gaming" them or otherwise exploiting the underlying system.

While the foregoing provides certain non-limiting example embodiments, it should be understood that combinations, subsets, and variations of the foregoing are contemplated. The monopoly sought is defined by the claims.

What is claimed is:

1. A non-transitory computer-readable medium comprising instructions executable by a processor to:
store associations of interaction indications to different interaction events;
store values for interaction indications;
maintain a plurality of accounts for a plurality of users performing the different interaction events;
receive a plurality of the interaction indications via the computer network from a plurality of terminals associated with the plurality of accounts, each interaction indication of the plurality of the interaction indications identifying a target account of the plurality of accounts;
for a set of interaction indications identifying a particular target account, combine the values of the set of interaction indications using a limiting function that accumulates the values of the set of interaction indications into an accumulated value and progressively limits the accumulated value with increasing interaction indications in the set; and output an indication of the accumulated value as a status of the particular target account among the plurality of accounts.

2. The non-transitory computer-readable medium of claim 1, wherein the limiting function comprises a logarithmic function.

3. The non-transitory computer-readable medium of claim 1, wherein the limiting function comprises a plurality of subset limiting functions applied to subsets of the set of interaction indications, each subset related to a different interaction event.

4. The non-transitory computer-readable medium of claim 3, wherein at least one of the subset limiting functions comprises a logarithmic function.

5. The non-transitory computer-readable medium of claim 3, wherein at least one of the subset limiting functions comprises a plurality of type limiting functions applied to different types of interaction indications related to one of the interaction events.

6. The non-transitory computer-readable medium of claim 5, wherein at least one of the type limiting functions comprises a logarithmic function.

7. The non-transitory computer-readable medium of claim 1, further comprising performing the combining and outputting for each account of the plurality of accounts.

8. The non-transitory computer-readable medium of claim 1, wherein the limiting function excludes a number of interaction indications over a threshold received from another account over a set time period.

9. The non-transitory computer-readable medium of claim 1, wherein the different interaction events comprise social media interactions.

10. The non-transitory computer-readable medium of claim 1, wherein the different interaction events comprise private-network interactions.

11. The non-transitory computer-readable medium of claim 1, wherein the different interaction events comprise real-world events.

12. A non-transitory computer-readable medium comprising instructions executable by a processor to:

send a plurality of interaction indications associated with a plurality of accounts via a computer network to a server, each interaction indication of the plurality of the interaction indications identifying a target account of the plurality of accounts, the server comprising stored associations of interaction indications to different interaction events, and stored values for the interaction indications, the server further comprising a plurality of accounts maintained for a plurality of users performing the different interaction events, wherein for a set of interaction indications identifying a particular target account, the server combines the values of the set of interaction indications using a limiting function that accumulates the values of the set of interaction indications into an accumulated value and progressively limits the accumulated value with increasing interaction indications in the set; and receive an output from the server, the output comprising an indication of the accumulated value as a status of the particular target account among the plurality of accounts.

13. The non-transitory computer-readable medium of claim 12, wherein the limiting function comprises a logarithmic function.

14. The non-transitory computer-readable medium of claim 12, wherein the limiting function comprises a plurality of subset limiting functions applied to subsets of the set of interaction indications, each subset related to a different interaction event.

15. The non-transitory computer-readable medium of claim 14, wherein at least one of the subset limiting functions comprises a logarithmic function.

16. The non-transitory computer-readable medium of claim 14, wherein at least one of the subset limiting functions comprises a plurality of type limiting functions applied to different types of interaction indications related to one of the interaction events.

17. The non-transitory computer-readable medium of claim 16, wherein at least one of the type limiting functions comprises a logarithmic function.

18. The non-transitory computer-readable medium of claim 12, further comprising performing the combining and outputting for each account of the plurality of accounts.

19. The non-transitory computer-readable medium of claim 12, wherein the limiting function excludes a number of interaction indications over a threshold received from another account over a set time period.

20. The non-transitory computer-readable medium of claim 12, wherein the different interaction events comprise social media interactions.

* * * * *